United States Patent Office 3,660,343
Patented May 2, 1972

3,660,343
ADHESIVE DENTAL FILLING MATERIAL AND
METHOD OF USING THE SAME
Jacob A. Saffir, Los Angeles, Calif., assignor to Dentsply International, Inc., York, Pa.
No Drawing. Filed June 17, 1970, Ser. No. 47,159
Int. Cl. C08g 51/04, 33/10
U.S. Cl. 260—37 EP                                    6 Claims

ABSTRACT OF THE DISCLOSURE

A color stable adhesive dental composition particularly adapted for use as a dental filling material for posterior and anterior teeth comprising a dentally acceptable thermosetting epoxy resin hardened with from about 2% to about 50% by weight, based on the weight of the epoxy resin of an N-3-oxohydrocarbon-substituted acrylamide of the formula

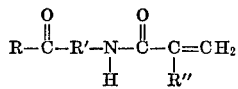

wherein R and R″ are each independently selected from hydrogen and lower alkyl radicals and R′ is selected from ethylene and lower alkyl substituted ethylene radicals. Such color stable dental composition preferably comprises about 17 to about 70% by weight of such hardened dentally acceptable epoxy resin and from about 10 to about 83% by weight of a finely divided ceramic filler. Due to the esthetic resemblance in color to dental enamel such adhesive dental composition can be utilized to fill both anterior and posterior teeth without the need for any special retentive means.

---

The present invention is directed to a novel adhesive dental filling composition and to a method of utilizing the same; more particularly, the present invention is directed to a color stable adhesive dental filling composition which due to its esthetic resemblance to dental enamel of natural teeth can be suitably employed for the filling of both anterior and posterior teeth without the need of any special retention means between the filling and the tooth.

The adhesiveness of dental filling materials has long presented a problem in the dental industry and profession. Past and present dental filling materials have either had very temporary adhesive properties or none at all for sealing themselves to the tooth structure. Thus, for example, a conventional dental amalgam is a good example of a filling material that has no adhesiveness at all in any stage of its use.

In the past, various attempts have been made to overcome this lack of adhesiveness in conventional dental filling materials. Thus, for example, various attempts to improve the relation between the dental filling material and the tooth have involved the use of mechanical retention means between the filling of the tooth or a special geometrical relationship between the filling and the tooth structure. For example, various attempts have been made to improve the retention between a conventional dental filling material and the tooth structure by the employment of a pin or other suitable anchor which is placed within the tooth cavity in an attempt to retain the dental filling material within the tooth. In a similar manner, a special geometric shape, that is, an undercut has been made within the tooth cavity in a further attempt to increase the retention.

All of such various attempts to improve the retention means for holding a dental filling in the tooth structure have involved considerable expense and/or labor and loss of tooth structure. In addition, such previous attempts have not produced the desired adhesiveness between the dental filling material and the tooth. Accordingly, previous attempts to improve the retention of dental filling material within the tooth structure have not been completely satisfactory and there is a frequent tendency for the dental filling material to become loose or be dislodged from the tooth structure.

A recent development in the production of adhesive dental filling compositions is shown in U.S. Patent 3,513,123. Such patent discloses a composition which eliminates the necessity for mechanical retention by providing an adhesive dental filling material which comprises an intimate admixture of epoxy resin and a material which is selected from a dental alloy or dental amalgam. While such a composition does provide suitable adhesion for retention within the tooth cavity, it is quite obvious that a composition containing a dental amalgam or dental alloy has certain limitations. In this regard, due to the coloration of the dental alloy or dental amalgam which must be employed with the epoxy resin to produce the adhesive dental filling material such a composition such as set forth in U.S. Patent 3,513,123 is not acceptable for filling anterior teeth wherein esthetic characteristics are of great importance. Accordingly, while the composition set forth in such U.S. patent has solved many of the problems associated with providing an adhesive dental filling material it should be quite obvious that the same has not yet provided for all of the needs by failing to provide a dental filling composition which can be employed for both anterior and posterior fillings and has the requisite adhesiveness so as to be useful without any special retention means.

It is additionally pointed out with regard to previously employed dental compositions that when utilizing the same it was heretofore imperative that the cavity be made absolutely dry before the filling or dental cement was inserted. In order to achieve this prefectly dry cavity all possible means and methods were employed including among others the use of a rubber dam where necessary. In this regard, moisture and/or saliva tends to reduce the efficiency of the conventional dental filling material so as to make the same unstable and unsatisfactory for many applications. Accordingly, since such moisture or saliva tends to make the filling material unstable and in some respects dissolve the dental filling material the tooth structure surrounding the filling is made more prone to decay due to the fact that gaps are sometimes formed between the tooth structure and dental filling. Accordingly, in addition to various attempts which have been made to produce a dental filling material having the requisite adhesive characteristics much research has been conducted in order to develop a dental material which will not be appreciably affected by the moisture content of the oral cavity when a dental material is set in place.

With the above in mind, such a dental composition useful as a dental cement or filling material has been discovered in accordance with the present invention. In this regard, such a color stable adhesive dental composition in accordance with the present invention useful as both a dental cement and dental filling material comprises a dentally acceptable thermosetting epoxy resin hardened with from about 2% to about 50% by weight, based on the weight of the epoxy resin of an N-3-oxohydrocarbon-substituted acrylamide. Preferably, such a composition additionally contains a finely divided ceramic filler.

In accordance with the present invention, it has been discovered that such a dental adhesive composition is translucent making the same suitable as a dental filling material for both anterior and posterior teeth by virtue of its esthetic resemblance in color to the dental enamel of natural teeth. Additionally, due to the adhesiveness of the dental composition the same can be employed without requiring the conventional mechanical retention means or special geometric configurations generally employed in the use of dental filling compositions. Moreover, in view of the strength of the dental filling composition of the present invention the same cannot only be suitably used for anterior and posterior teeth but can be used to restore incisal and masticatory surfaces.

Accordingly, it is a principal object of the present invention to provide a color stable adhesive dental composition useful as a dental cement or dental filling which composition eliminates the inherent deficiencies and disadvantages of previously utilized dental compositions.

It is a further object of the present invention to provide such a dental filling composition which is adhesive and translucent and, thus, can be suitably used for both anterior and posterior teeth by virtue of its esthetic resemblance and color to the dental enamel of natural teeth.

It is yet a further object of the present invention to provide such a novel adhesive dental composition which can be utilized as a dental filling without the need for conventional mechanical retention means or special geometric configurations and because of its improved strength can be used not only for anterior and posterior teeth but also to restore incisal and masticatory surfaces.

It is yet a still further object of the present invention to provide such an adhesive dental composition which is sufficiently strong and adhesive as to permit its use in place of prior art cements for cementing into place those fillings or crowns which generally provide a poor fit or leave a space or void between the restoration and tooth wall.

It is yet a further object of the present invention to provide such a color stable adhesive dental composition comprising a dentally acceptable thermosetting epoxy resin hardened with an N-3-oxohydrocarbon-substituted acrylamide, said composition preferably containing a finely divided ceramic filler.

Still further objects and advantages of the novel adhesive dental composition of the present invention will become more apparent from the following more detailed description thereof.

As indicated previously, in addition to possessing all of the necessary characteristics of a dental cement or dental filling material, the novel compositions of the present invention have the advantage that the same possess adhesive characteristics thereby eliminating the need for special retention means or special geometric configurations usually adapted with conventional dental filling materials. In addition, the novel compositions of the present invention find advantage over such compositions such as set forth in U.S. Patent 3,513,123 in that the compositions are translucent as well as adhesive and, thus, are eminently suited for both anterior and posterior teeth because of their esthetic resemblance in color to the dental enamel of natural teeth. This characteristic is associated with the use of the particular hardener as hereinafter described which use of hardener does not in any way tend to discolor the epoxy resins employed in accordance with the novel compositions of the present invention.

In addition, the novel dental compositions of the present invention are sufficiently strong and adhesive as to be useful in the same manner as conventional dental cements and to be useful to restore incisal and masticatory surfaces of the teeth.

The foregoing objects and advantages of the novel composiiton of the present invention are achieved through the use of a dental composition comprising a dentally acceptable thermosetting epoxy resin hardened with an N-3-oxohydrocarbon-substituted acrylamide, such composition optionally containing a finely divided ceramic filler. The epoxy resin suitable in accordance with the present invention can comprise any of those which are exemplified, for example, in U.S. Patent 3,513,123. Thus, the adhesive dental filling composition of the present invention can contain any of the known resinous organic compounds containing at least one epoxy group, i.e.,

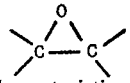

The only requisite characteristics of the epoxy resin to be employed in the composition of the present invention is that such resin should have the requisite adhesiveness so as to create adhesion between the filling composition and the tooth structure and such epoxy resin be one which is relatively nonirritating to the tooth structure and surrounding gum area.

These compounds may be saturated or unsaturated, aliphatic, cycloaliphatic, aromatic, or heterocyclic and may contain substituents such as halogen atoms, OH groups, ether radicals and the like.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups. Such resins are commonly referred to as glycidyl polyethers.

Among the polyhydric phenols which may be used in preparing such glycidyl polyethers are the mononuclear phenols such as resorcinol, catechol, hydroquinone, etc. and the polynuclear phenols, such as bis(4-hydroxyphenol)-2,2-propane,
4,4-dihydroxybenzophenone,
bis-(4-hydroxyphenyl)-1,1-ethane,
bis(4-hydroxyphenyl)-1,1-isobutane,
bis(4-hydroxyphenyl)-2,2-butane,
bis(4-hydroxy-2-methylphenyl)-2,2-propane,
bis(4-hydroxy-2-tertiary butylphenyl)-2,2-propane,
bis(4-hydroxy-2,5-dichlorophenyl)-2,2-propane,
4,4'-dihydroxybiphenyl,
4,4'-dihydroxypentachlorobiphenyl,
bis(2-hydroxynaphthryl)-methane,
1,5-dihydroxy naphthalene,
phloroglucinol,
1,4-dihydroxynaphthalene,
1,4-bis-(4-hydroxyphenyl) cyclohexane, etc.

as well as other complex polyhydric phenols such as pyrogallol, phlorogucinol and novolac resins from the condensation of a phenol with an aldehyde in the presence of an acidic condensation catalyst. For the nature and preparation of novolac resins, see the book by T. S. Carswell, "Phenoplasts," 1947, page 29, et seq.

The preferred polynuclear phenol is bis(4-hydroxyphenyl)-2,2-propane, known in the trade as bisphenol-A.

In admixture with the named polynuclear phenols, use also may be made of those polynuclear phenols wherein the phenol nuclei are joined by sulfur bridges, as for example, in 4,4'-dihydroxydiphenyl sulfone.

Additionally polyethers of aliphatic polyhydric alcohols, such as the polyglycidyl ethers thereof, as for example, the diglycidyl ethers of ethylene glycol, propylene glycol, trimethylene glycol, butylene glycol, diethylene glycol, 4,4'-dihydroxydicyclohexyl glycerol, dipropylene glycol and the like, as well as ethers containing more than two glycidyl groups such as the glycidyl polyethers, glycerol mannitol, sorbitol, polyallyl alcohol, polyvinyl alcohol and the like can be used.

These epoxy resins, glycidyl polyethers as they are frequently called, may be prepared by reacting predetermined amounts of at least one polyhydric compound and one epihalohydrin in an alkaline medium. While it is preferred to employ epichlorohydrin as the epihalohydrin in the preparation of the epoxy materials of the present invention, other epihalohydrins such as epibromohydrin may be used advantageously.

In the preparation of these epoxy resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred. All of these procedures are well known in the art for the production of glycidyl ethers.

Glycidyl polyethers are disclosed in various places in the art; among the references which may be mentioned are U.S. Patents 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; 2,633,458; 2,716,099; 2,801,227; 2,801,989; 2,806,016; 2,840,541; 2,841,595; 2,851,825; 2,857,362; 2,865,887; 2,879,259; 2,910,455; 2,965,611; 2,986,551; 2,986,552; 2,995,583; 3,004,951; 3,013,087; 3,015,647; 3,017,387; 3,033,803; 3,033,816; 3,033,818; 3,033,820; 3,033,821; 3,061,588; 3,069,434; 3,074,974; 3,092,610; 3,095,429; 3,102,874; 3,123,586; 3,219,670; 3,232,993; 3,285,862; 3,297,519; 3,298,998; 3,299,169; 3,309,339; 3,313,775; 3,317,470; and 3,325,452.

A full description of these glycidyl ether type of epoxy resins can be found in the Handbook of Epoxy Resins, Lee and Neville, McGraw-Hill, 1967.

Another group of epoxy resins that may be used in the composition of the present invention comprises those epoxy resins derived by the reaction product of an olefin or polyolefin with an epoxidizing material. Thus, for example, a typical reaction involves the reaction of peracetic acid and unsaturated compounds such as polybutadiene. A typical member of this class of epoxy resin is derived from butadiene and crotonaldehyde which have undergone the Diels-Alder condensation and the Tischenko reaction. Other epoxidized olefins such as epoxidized polybutadiene resins are described in various patents such as U.S. Patent 2,829,135.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Patent 2,847,394.

Another group of epoxide resins are those produced by the epoxidation of an ester of a higher fatty acid, e.g., by the reaction of an ester of a higher fatty acid with hydrogen peroxide and acetic acid in the presence of an acid cation exchange resin such as nuclear sulfonic and phenolic methylene sulfonic cation exchange resins. Such epoxide resins and their preparation are more fully described in U.S. Patent 2,919,283.

All of these epoxy resins are also fully described in the Handbook of Epoxy Resins, Lee and Neville, McGraw-Hill, 1967.

All of the epoxy resins described above are well known in the art and, are sold under various trade names. Included among these for example are: Epon 815, Epon 820, Epon 828, Epi-Rez 504, Epi-Rez 509, Epi-Rez 510, Epi-Rez 6001, ERL 2774, Epon 1001, Epon 1004, Epon 1007, Ep 201, Resiweld Epoxy FE–096–9, etc.

In U.S. Patent 3,513,123 it is suggested that the foregoing epoxy resins suitably employed in the adhesive dental filling composition of that patent can be cured with the well known epoxy curing agent such as for example, aliphatic and aromatic primary, secondary and tertiary amine; oxyamines; hydroxy-alkylated polyamines; phenolic tertiary amines and salts thereof; cyanamides and polymerization products thereof; and primary carboxylic acid amides and polyfunctional carboxylic acid amides among others.

In addition to the foregoing nitrogen-containing curing agents which can be suitably employed in the curing or hardening of the epoxy resins exemplified above, U.S. Patent 3,513,123 exemplifies various organic and inorganic acids and anhydrides as suitable curing or hardening agents. Such patent indicates that the hydroxy ethyl diethylene triamine type of hardening agents are preferred for use in the dental adhesive composition since such materials are completely non-irritating and non-sensitizing when employed in the amounts necessary to produce the adhesive dental filling material.

All of the above materials, including the preferred materials of U.S. Patent 3,513,123 can provide suitable dental compositions for use in posterior teeth. The use of all of the aforementioned hardening agents is disadvantageous in that the use of the same tends to discolor and darken the epoxy resin making the same totally unsatisfactory where esthetic properties are necessary. With this in mind it has been the general desire to provide a new class of hardening agents or curing agents which when utilized to cure an epoxy resin of the type set forth above would provide a translucent composition suitable for both anterior and posterior teeth.

Such a novel class of hardening agents has been found in accordance with the present invention and are identified as N-3-oxohydrocarbon-substituted acrylamides of the formula:

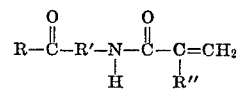

wherein R and R" are each selected from the class consisting of hydrogen and lower alkyl radicals and R' is selected from the class consisting of ethylene and a lower alkyl-substituted ethylene radical.

The lower alkyl radicals are those containing no more than about 10 carbon atoms and include also the cycloalkyl radicals. They are exemplified by methyl, ethyl, propyl, isopropyl, butyl, sec-butyl, n-pentyl, cyclohexyl, cyclopentyl, isooctyl, n-decyl, and 4-ethyl-2-hexyl radicals.

The radical R' is ethylene or an ethylene radical having at least one lower alkyl substituent on the carbon atom which is attached directly to the nitrogen atom of the acrylamide. For purposes of convenient reference, the two carbon atoms of the principal chain of the ethylene radical are designated numerically beginning from the nitrogen atom; i.e., the carbon atom attached directly to the nitrogen atom is designated as atom number 1 and the other as atom number 2. Thus, the R' radicals are illustrated by ethylene, 1-methyl ethylene, 1,1-dimethyl ethylene, 1,1,2-trimethyl ethylene, 1-methyl-1-ethyl ethylene, 1-methyl-1-isobutyl ethylene, 1-ethyl-1-isopropyl ethylene, 1,1-diisopropyl ethylene, 1,2-dimethyl ethylene, 1-n-butyl-1-n-pentyl ethylene, 1-methyl-1-cyclohexyl ethylene, etc.

The radical R" is preferably a hydrogen radical. In some instances it may be a lower alkyl radical such as illustrated previously.

Specific examples of the N-3-oxohydrocarbon-substituted acrylamides include

N-3-oxopropyl acrylamide,
N-3-oxobutyl acrylamide,
N-3-oxo-1-methyl-butyl acrylamide,
N-3-oxo-1,1-dimethyl-butyl acrylamide,
N-3-oxo-1-methyl-1,3-dicyclohexylpropyl acrylamide,
N-3-oxo-1,2-dimethyl-1-ethyl-butyl acrylamide,
N-3-oxo-1,5-dimethyl-1-isopropyl-hexyl acrylamide,
N-3-oxo-1,1-diisobutyl-2-isopropyl-5-methylhexyl acrylamide,
N-3-oxo-1,1-dibutyl-2-propyl-heptyl acrylamide,
N-3-oxo-1-methyl-butyl alpha-methyl acrylamide, etc.

Of the foregoing materials, the hardener N-3-oxo-1,1-dimethyl-butyl acrylamide, commonly known as diacetone acrylamide is preferred in accordance with the present invention.

Such N-3-oxohydrocarbon-substituted acrylamides and their methods of production are more fully described in U.S. Patent 3,277,056 the disclosure of which is herein incorporated by reference.

The foregoing hardeners are commercially available products sold by the Lubrizol Corp. under the trade names Ca 21, Ca 22, and Ca 23, for example.

In accordance with the present invention the amount of such hardener employed in order to cure or harden the epoxy resin generally depends upon the type of resin, the type of hardener and the type of use to which the final composition is to be put. In general, however, the hardener or curing agent useful in accordance with the present invention is employed in an amount which varies from about 2% to about 50% or more by weight based upon the weight of the epoxy resin. It is, of course, obvious that somewhat lesser or greater amounts can be employed where desired for particular purposes.

In addition to the non-toxic epoxy resin and N-3-oxo-hydrocarbon-substituted acrylamide hardener as described above, the novel cement and filling composition of the present invention preferably contains an inorganic portion, i.e., a finely divided ceramic filler. In accordance with the present invention such ceramic portion of the dental composition can be varied considerably although it is preferred to employ a ceramic material which does not adversely affect the translucent properties of the dental composition. Thus, for example, the inorganic portion of the novel adhesive dental composition of the present invention can comprise a powdered feldspar, powdered quartz, powdered glass or even a powdered sand material conventionally utilized in dental compositions.

The feldspars which can be advantageously utilized in accordance with the present invention can comprise any of the three groups naturally occurring in nature, either individually or mixed. Thus, for example, the feldspars can be selected from:

Soda feldspars—
$$Na_2O Al_2O_3 . 6SiO_2$$
or
$$NaAlSi_3O_8$$
Potash feldspars—
$$K_2O Al_2O_3 . 6SiO_2$$
or
$$KAlSi_3O_8$$
Lime feldspars—
$$CaO . Al_2O_3 . 2SiO_2$$
or
$$CaAl_2Si_2O_8$$

In addition, the silicas which can be employed in accordance with the present invention are all well known conventional dental filler materials. These also may be classified into three main groups to be employed individually or collectively or together with one or more of the feldspars described above. Thus, for example, the silicas may be of the rock type generally known as quartz stone, may be of the granular type commonly known as silica sand, or may be of the powdered type commonly known as amorphous silica or diatomaceous earth.

In addition, the filler employed in the adhesive dental composition of the present invention can comprise a mixture of materials generally utilized to produce a ceramic dental enamel. Thus, for example, the average enamel composition has the following formula:

| Ingredients: | Enamel composition, percent |
| --- | --- |
| Feldspar | 85–95 |
| Kaolin | 1–5 |
| Silica | 1–5 |
| Pigments | 0–1 |
| Opacifier | 0–1 |

The principal raw materials used in the above formula are:

| | |
| --- | --- |
| Potash feldspar | 93.5 |
| Silica sand | 4.5 |
| Kaolin | 2.0 |

With regard to the inorganic portion of the adhesive dental composition of the present invention, it is pointed out that the size of the inorganic material is not of significant importance except that the same should be of a size falling within the standard set by the American Dental Association. It is, of course, obvious that too large a grain size is not satisfactory from an esthetic standpoint since should a portion of the inorganic material be worn away from the surface of the tooth a surface imperfection would be present. Accordingly, it is preferred in accordance with the present invention that the inorganic portion of the adhesive dental composition be of a particle size varying from about 20 mesh to about 400 mesh. Where the adhesive composition is used to simulate the enamel of anterior teeth it is preferred that the particle size of the inorganic portion of the composition be of a finer mesh, i.e., of a mesh of 270 or above. Where, however, the adhesive dental composition is used for posterior teeth or where occluding surfaces are being reproduced a coarser mesh particle size can be utilized, i.e., a mesh of 170 to 200. It is to be noted, however, that the particle size of the inorganic portion of the adhesive dental composition of the present invention whether used for the filling of anterior or posterior teeth should be within the aforedescribed limits of about 20 mesh to about 400 mesh. Of course, slightly finer or coarser particles can be employed for particular purposes where desired without departing from the true scope of the present invention.

When the inorganic portion is employed in accordance with the present invention it is preferred that the same comprise about 10% to about 83% by weight of the adhesive dental composition. Accordingly, in such composition it is preferred that the organic portion, i.e., epoxy resin and hardener, comprise from about 17 to 90% by weight, based upon the weight of the total composition. Within those limits a very suitable dental composition is prepared which, due to its strength and adhesiveness allows the same to be effectively utilized for the filling of both anterior and posterior teeth as well as allowing the restoration of incisal and masticatory surfaces.

In addition to the properties of strength and translucency as set forth above it is pointed out that the novel composition is one which is not adversely affected by the moisture contained within the oral environment. Because of this, the novel adhesive dental composition of the present invention can be utilized without the need for special precautions making sure that the oral cavity is absolutely dry prior to use of the composition as a cement or filling. This allows for tremendous advantages in that the stability of the composition as a cement or filling is not in any way deleteriously affected by changes in moisture content.

Similarly, as indicated previously, the use of the N-3-oxo-hydrocarbon-substituted acrylamide hardening or curing agent for the epoxy resin component of the novel adhesive dental composition of the present invention provides for a composition which does not have a color change or darkening with age, a characteristic associated with conventionally cured epoxy resins. This being the case; the compositions of the present invention are eminently suited for the adhesive filling of anterior teeth, a use to which the compositions such as set forth in U.S. Patent 3,513,123 could not be previously put.

In addition, as previously indicated, the novel composition of the present invention is suitable as a dental cement in addition to its suitability as an adhesive dental composition.

In this regard, due to the esthetic characteristics and strength characteristics of the adhesive material the same can be employed in place of a conventionally utilized cement for cementing into place those fillings or crowns whose poor fit leaves a space or void between the restoration and the tooth wall. Thus, while ordinary cements under such ill-fitting circumstances may cause an unesthetic noticeable cement line the solubility of which in saliva makes the teeth vulnerable to decay in the cement areas, the use of the composition of the present invention avoids such shortcomings. Thus, by merely mixing a composition of the present invention more thinly than would be required for a replacement filling, a strong adhesive cement-like medium is obtained lending itself ideally to conventional dental practice. Accordingly, when used as a cement the composition should contain no filler whatsoever or an amount of filler in the lower range set forth previously, i.e., from about 10 to about 40% by weight based upon the total weight of the composition.

It is additionally pointed out that in addition to using the filling composition of the present invention as a total filling material the same can be advantageously employed in accordance with the present invention as a filling material suitable for replacing decayed areas often occurring around the margins of an existing filling without having to remove the entire old filling. This is possible in accordance with the present invention due to the adhesive and esthetic characteristics of the composition of the present invention. Accordingly, by eliminating the need for removal of the entire filling the tooth structure is conserved since there is no necessity for further drilling or manipulation. This, of course, comprises a further advantage of the use of the novel adhesive dental composition of the present invention.

It should be quite obvious that in preparing the novel composition of the present invention no special precautions need be taken since it is merely necessary to mix the suitable epoxy resin and hardener or epoxy resin, hardener and inorganic portion of the composition. Similarly, when using the composition of the present invention as a dental cement or adhesive dental filling composition no special precautions need be taken but the dentist or technician can merely utilize the composition as a filling or cement without the need of any special retention means or geometric configurations. In this regard, when utilizing the composition of the present invention as an adhesive dental filling such composition can be utilized in the same manner as the adhesive dental composition set forth in U.S. Patent 3,513,123.

The novel dental filling compositions of the present invention will now be illustrated by reference to the following specific examples. It is to be understood, however, that such examples are presented for purposes of illustration only and the present invention is not in any way to be deemed as limited thereto.

EXAMPLE 1

An adhesive dental filling composition was prepared by admixing 50 parts by weight of a glycidyl ether type of epoxy resin prepared by the reaction of epichlorohydrin and bisphenol A (E.R.L.-2774-Union Carbide and Carbon Co.) the epoxy resin composition being prepared by admixing 75% by weight of the glycidyl ether epoxy resin and 25% by weight of the hardener comprising diacetone acrylamide, and 50% by weight of an enamel filler having the following composition:

| | Percent |
|---|---|
| Feldspar | 90 |
| Kaolin | 5 |
| Silica | 5 |

In applying the above adhesive dental composition in accordance with the present invention, the dentist merely prepares a tooth cavity by drilling, taking no special measures in order to create retention between the filling composition and the tooth structure. Thus there is no need for any special geometric configuration or mechanical retention means since the adhesiveness between the filling and tooth structure is present in the adhesive composition per se. The epoxy resin within the dental filling composition cures in place, i.e., within the oral environment, in approximately 8 to 12 minutes so as to provide a hard dental filling material having substantially no tendency to be dislodged or allow leakage between the tooth structure and the dental filling.

On examination, teeth filled with the dental filling composition of the present invention showed that the adhesive composition substantially prevented leakage from occurring around the filling in the restoration area and that no tendency for the filling to dislodge occurred. This is not the case, however, wherein a conventional dental filling material is employed without the aid of special mechanical geometric devices to aid in the retention of the filling composition.

The compositions above produced utilizing an inorganic filler having a size wherein the particles varied from about 270 to about 400 mesh were eminently suited for the filling of anterior teeth. Similarly, those compositions wherein the inorganic filler had mesh sizes of 170 to 200 mesh were particularly desirable for the filling of posterior teeth and occluding surfaces. This is because the natural appearance of tooth enamel can be simulated by the use of the dental filling composition of the present invention.

In this regard, contrary to conventional epoxy resin compositions and other dental filling compositions the composition of the present invention had no tendency to discolor or darken upon curing and prolonged standings. In this regard, the color of the composition after curing in situ within the oral environment was substantially identical with that prior to curing. This is associated with the employment of the particular hardening agents in association with the epoxy resin. Additionally, even when the filling was in place for a substantial period of time no darkening or discoloring of the filling was observed. This, therefore, provides an advantage of the composition of the present invention over conventional filling compositions.

EXAMPLE 2

Example 1 is repeated except that the epoxy resin portion was employed in an amount of 25 parts by weight and the inorganic enamel filler in an amount of 75 parts by weight. Again, however, a very esthetic and strong adhesive dental filling composition requiring no special retention means or geometric configurations was produced. This composition was very satisfactory in simulating the appearance of natural tooth enamel.

EXAMPLE 3

Example 1 was again repeated except that the proportions were 75 parts by weight of the epoxy resin composition and 25 parts by weight of the inorganic enamel filler. Again, an adhesive dental composition was prepared which esthetically matched natural tooth enamel and could be used without the need of special retention means or geometric configurations.

EXAMPLE 4

Example 1 is again repeated except that the epoxy resin composition was varied by varying the amount of the diacetone acrylamide hardener based upon the amount of glycidyl ether epoxy resin. The amount of hardener, i.e., diacetone acrylamide, was varied from 5%, 10%, 30% and 45% by weight based upon the organic portion of the adhesive composition. In all cases, a very satisfactory adhesive dental filling composition was prepared.

EXAMPLE 5

Example 1 was again repeated except that in lieu of diacetone acrylamide the following hardeners were employed in an equivalent amount:

(A) N-3-oxopropyl acrylamide
(B) N-3-oxo-1-methyl-butyl acrylamide
(C) N-3-oxo-1,2-dimethyl-1-ethyl-butyl acrylamide
(D) N-3-oxo-1,1-dibutyl-2-n-propyl-heptyl acrylamide In all cases, when employing the foregoing hardeners in lieu of diacetone acrylamide substantially equivalent adhesive dental fitting compositions were prepared.

EXAMPLE 6

Example 1 is again repeated except that in lieu of the glycidyl ether type of epoxy resin utilized in such example a commercial epoxidized olefin type of epoxy resin was utilized in a substantially equivalent amount. Such commercially available epoxidized olefin type of epoxy resin comprised the reaction product derived from butadiene and crotonaldehyde sold under the trademark EP 201. Again, the organic portion of the adhesive dental composition contained 75% by weight of the epoxy resin and 25% by weight of the hardener, diacetone acrylamide. The inorganic portion, i.e., enamel, was substantially as set forth in Example 1.

When utilizing the epoxidized olefin type epoxy resin, a similar adhesive dental filling composition was prepared. Here again, the composition produced as above was found to very satisfactorily simulate the appearance of natural tooth enamel while providing an adhesive filling not requiring any special retention means or geometrical configuration.

EXAMPLE 7

Example 1 was again repeated except that the inorganic portion, i.e., particulate enamel, was completely eliminated. The composition merely comprising the epoxy resin and diacetone acrylamide hardener was found to be eminently suitable as a dental cement. This composition could be used in any environment in which a conventional dental cement was utilized, the composition having the advantage of color stability in that the color of the composition did not tend to change after curing or upon prolonged standing.

EXAMPLE 8

A fluid composition useful as a dental cement or adhesive dental composition was prepared by repeating Example 1 except that the epoxy resin portion of the composition constituted 90 parts by weight and the inorganic filler, comprising 10 parts by weight, was a very fine silica, the mesh sizes being from about 320 to 400 mesh. As in Example 1, this composition was capable of being cured in the oral environment in a period of about 8 to about 12 minutes. Again, a very useful esthetic product was obtained.

EXAMPLE 9

Example 1 is again repeated except that the inorganic portion of the composition is replaced with the following materials.

(A) Quartz stone of 60–100 mesh
(B) Diatomaceous earth of 150 to 250 mesh
(C) Potash feldspar of 170 to 200 mesh It can clearly be seen from the foregoing that the present invention does, in fact, provide a distinct advantage in the art of dental composition including dental cement and dental fillings and methods of using the same. In this regard, by employing the epoxy resin and particular hardener of the present invention with or without an inorganic filler portion it is possible to provide a dental filling or cement composition having the properties of adhesiveness and, in addition, sufficient strength and esthetic characteristics as to be suitably utilized in a variety of environments. In this regard, the strength of the compositions of the present invention make them particularly suited for occluding or masticatory surfaces while the esthetic characteristic allows the adhesive dental composition to be employed for filling both anterior and posterior teeth. In addition, due to the use of the particular N-3-oxohydrocarbon-substituted acrylamide hardener a composition has been developed which does not darken or discolor upon curing or upon use such that a translucent composition can be prepared which can very closely approximate the appearance of natural tooth enamel. This coupled with the fact that the novel composition of the present invention is adhesive and does not require special retention means or special geometric configuration makes the novel compositions of the present invention particularly adapted for use in the oral environment.

While various preferred embodiments of the present invention have been specifically illustrated by way of the foregoing examples, it is to be understood that the present invention is in no way to be deemed as limited thereto but must be construed as broadly as any and all equivalents thereof.

What is claimed is:

1. A color stable adhesive dental composition consisting essentially of a dentally acceptable thermosetting epoxy resin hardened with from about 2% to about 50% by weight, based on the weight of the epoxy resin, of an N-3-oxohydrocarbon-substituted acrylamide of the formula:

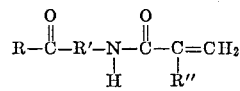

wherein R and R" are each independently selected from hydrogen and lower alkyl and R' is selected from ethylene and lower alkyl substituted ethylene radicals.

2. The composition of claim 1 wherein said N-3-oxohydrocarbon-substituted acrylamide is diacetone acrylamide.

3. A color stable adhesive dental composition comprising:

(a) about 17 to 90% by weight of a dentally acceptable thermosetting epoxy resin hardened with from about 2% to about 50% by weight, based on the weight of the epoxy resin, of an N-3-oxohydrocarbon-substituted acrylamide of the formula:

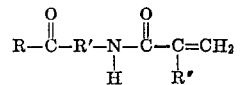

wherein R and R" are each independently selected from hydrogen and lower alkyl and R' is selected from ethylene and lower alkyl substituted ethylene radicals and (b) about 10 to about 83% by weight of a finely divided ceramic filler.

4. The composition of claim 3 wherein said N-3-oxohydrocarbon-substituted acrylamide is diacetone acrylamide.

5. The composition of claim 3 wherein said finely divided ceramic filler is selected from powdered feldspar, powdered quartz, powdered glass and powdered sand.

6. The composition of claim 3 wherein said ceramic filler has a particle size of between about 20 mesh and about 400 mesh.

References Cited

UNITED STATES PATENTS 3,066,112   11/1962   Bowen _____ 260—37 Ep
3,194,784   7/1965    Bowen _____ 260—37 Ep
3,454,669   7/1969    Laudise _____ 260—2 EN LEWIS T. JACOBS, Primary Examiner U.S. Cl. X.R.

260—2 N, 47 EN